United States Patent [19]

Bely et al.

[11] Patent Number: 4,497,867

[45] Date of Patent: Feb. 5, 1985

[54] MULTIWIRE TWISTED CONDUCTOR AND DEVICE FOR COATING TWISTED CONDUCTOR WIRES

[75] Inventors: Diamar I. Bely; Valentin P. Mardanov, both of Moskovskoi; Gennady I. Meschanov, Moscow; Izyaslav B. Peshkov, Moscow; Anatoly P. Povelichenko, Moscow; Jury M. Timoshin, Moskovskoi, all of U.S.S.R.

[73] Assignee: Vsesojuzny Nauchno-Isslefovatelsky, Proektno-Konstruktorsky I Tekhnologichesky Institut Kabelnoi Promyshlennosti "VNIIKP", U.S.S.R.

[21] Appl. No.: 466,358

[22] Filed: Feb. 14, 1983

[51] Int. Cl.[3] .......................... B32B 15/00; H01B 5/00

[52] U.S. Cl. .............................. 428/385; 174/126 CP; 228/224; 228/56; 428/381; 428/545; 428/621; 428/626; 428/389

[58] Field of Search ............... 428/379, 381, 385, 380, 428/389, 545, 621, 626; 174/126 CP; 228/19, 56 R, 179, 224, 247

[56] References Cited

U.S. PATENT DOCUMENTS

| | | | |
|---|---|---|---|
| 1,980,890 | 11/1934 | Tompkins | 228/56 R |
| 2,336,219 | 12/1943 | Brown | 428/380 X |
| 3,274,331 | 9/1966 | Quigley | 228/56 X |
| 3,333,047 | 7/1967 | Geoffroi | 228/224 |
| 3,516,858 | 6/1970 | Fitzhugh et al. | 428/385 X |
| 3,875,896 | 4/1975 | Trattner et al. | 428/385 X |
| 4,042,753 | 8/1977 | Smith | 174/126 CP |

FOREIGN PATENT DOCUMENTS

| | | |
|---|---|---|
| 262575 | 1/1970 | U.S.S.R. . |
| 546661 | 3/1977 | U.S.S.R. . |

OTHER PUBLICATIONS

"Hookup Wires Used in Foreign Practice", Moscow, 1963, pp. 24–25—with English Translation.

"The Chemistry of Dielectrics", I. M. Maiofis, Khimiya Publishers, Moscow, 1981, pp. 206–207—with English Trans.

*Primary Examiner*—Lorraine T. Kendell
*Attorney, Agent, or Firm*—Steinberg & Raskin

[57] ABSTRACT

A multiwire twisted conductor comprising wires coated with materials serving to permit soldering and protection of the wires against corrosion, with at least one wire in a conductor cross section coated with a fluxing material, and with all other wires coated with a fusible metal or alloy. A device for coating of wires in the multiwire twisted conductor, comprising a bath of melt whereto an immersion device dips the wire fed from a feed section of a take-up and feed mechanism to a take-up section through a pass, and a fluxing device, with said wire immersion device equipped with a periodic effect drive serving for periodic action on the wire.

8 Claims, 7 Drawing Figures

MULTIWIRE TWISTED CONDUCTOR AND DEVICE FOR COATING TWISTED CONDUCTOR WIRES

FIELD OF THE INVENTION

The present invention relates to cable engineering, and, more specifically, to multiwire twisted conductors and to construction of a device for coating of twisted conductor wires.

BACKGROUND OF THE INVENTION

Known in the art are connecting cables, the multiwire twisted conductor whereof is composed of wires, each bearing a coating serving to permit soldering and to protect the copper wires against corrosion, with said coating made, for example, of polyurethane (cf., Mayofis I. M., Chemistry of Dielectrics (in Russian), Moscow, 1981, p. 206). If the wires are to be soldered, one end of the conductor is immersed into molten tin, whereby the conductor length immersed into the melt undergoes tinning. However, in case of the multiwire twisted conductor of the foregoing design, the thickness of the polyurethane coating is not less than 10μ, with the result that the wire diameter is large, and the enamel coating procedure is inefficient. Besides, the service dependability of the conductor in the soldered joint areas is low since the elastic polyurethane coating is at these points in contact with rigid sections coated with tin, and is susceptible to breakage in bending.

There is also known a multiwire twisted conductor, each wire whereof bears a coating applied through the full length to permit soldering and protection of the conductor against corrosion, comprising wires with said coating made of fusible metals or alloys (ref. Foreign-Made Connecting Wires, (in Russian), Moscow, 1963, p. 24). However, the above-mentioned multiwire twisted conductor is disadvantageous in low service dependability resulting from stiffness of the soldered joint (with the soldered joint extending at heating to the areas adjacent to the point of soldering), and also in excessive consumption of tin and excessive weight (with the thickness of the tin coating equal to 3 to 7μ whereas the thickness of the coating sufficient for high-quality soldering is nearly equal to that of a monomolecular layer).

Since the prior-art multiwire twisted conductors are used extensively, the losses of expensive and deficient tin are high, and the weight and size of cables increase because the wires bear the fusible metal coatings through the full length thereof, and not in local areas. In addition, the service dependability of the conductors decreases because the soldered joints extend to the adjacent areas.

There is known a device for tinning long-size products, such as wires, comprising a bath of melt, an immersion device for dipping the wire into the melt, and take-up and feed mechanisms (cf., USSR Inventor's Certificate No. 262575, Cl. C23C 1/14).

The prior-art device is disadvantageous in that the efficiency thereof is low, and the coating applied to the wire must invariably be continuous because of the constructional features of said device.

Also known is a device for wire coating, comprising a bath of melt, a wire immersion device disposed on the bath of melt, a take-up and feed mechanism, and a pass for removal of excess tin from the wire (cf., USSR Inventor's Certificate No. 546661, Cl. C23C 1/14).

A disadvantage also inherent in the foregoing device resides in low efficiency. Besides, the expenditure of coating material used during operation of said device is high because of a high coating thickness and variation in thickness of the coating.

The prior-art device does not provided for tinning of locally alternating areas of wire during continuous operating procedure.

SUMMARY OF THE INVENTION

It is an object of the present invention to improve the service dependability of a multiwire twisted conductor, to reduce the weight thereof and the expenditure of fusible metals or alloys used in coating, and at the same time to reduce the cost of the multiwire twisted conductor wire coating process.

This object is accomplished in a multiwire twisted conductor comprising wires bearing coatings serving to permit soldering the conductor and to protect it against corrosion, wherein, according to the invention, at least one wire in any conductor cross section is coated with a fluxing composition, and all other wires are coated with a fusible metal or alloy.

It is expedient that the coatings of wires in the multiwire twisted conductor according to the invention should be homogeneous through the full length of the wires. The coatings of fluxing composition and fusible metal or alloy applied to the multiwire twisted conductor according to the invention may be located in areas alternating through the full length of the wires.

The parameters of each wire in the multiwire twisted conductor according to the invention must meet the following condition:

$$l\delta/S = 0.01 \text{ to } 10.0,$$

where:

l is the length of the coated area;

δ is the coating thickness;

S is the coating cross-section area.

It is preferable that a device for coating the twisted conductor wires, comprising a bath of melt, a fluxing device, a wire immersion device disposed above the bath, a take-up and feed mechanism and a pass should incorporate, according to the invention, a periodic effect drive fitted to the immersion device.

The wire immersion device according to the invention may be constructed in the form of an eccentric cam linked with the drive.

The wire immersion device according to the invention may also be constructed as a hollow frame provided with a slot and rotatably installed in guides, with an axis of rotation of the hollow frame aligned with that of holes in passes.

The wire immersion device according to the present invention may further be constructed in the form of a pendulum adapted to swing in a vertical plane.

The present invention will improve the service dependability of the multiwire twisted conductor due to reduction of the area of soldering, will reduce the expenditure of fusible metals and alloys used for coating the wires and reduce the weight thereof by coating the wires in such a manner that the areas coated with fusible metals or alloys alternate in staggered order with the areas coated with a fluxing composition, and will permit constructing a device providing for applying the coating with locally alternating areas.

BRIEF DESCRIPTION OF DRAWINGS

These and other advantages of the present invention will become more fully apparent from the following description of preferred embodiments thereof taken in conjunction with the accompanying drawings, wherein.

DETAILED DESCRIPTION OF THE INVENTION

Figure 1:
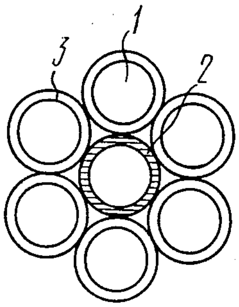
FIG. 1 shows a cross section of a multiwire twisted conductor according to the invention.

Referring to FIG. 1 showing a cross section of a multiwire twisted conductor, the conductor comprises wires 1 made, for example, of copper and bearing coatings 2 and 3 serving to permit soldering and protection of the multiwire twisted conductor against corrosion. At least one wire 1, for example, the central one, bears the coating 2 made of a fluxing composition, and all the other wires 1 bear the coatings 3 made of a fusible metal, such as tin or alloy. The coatings 2 and 3 can extend through the full length of the wires.

Figure 2:
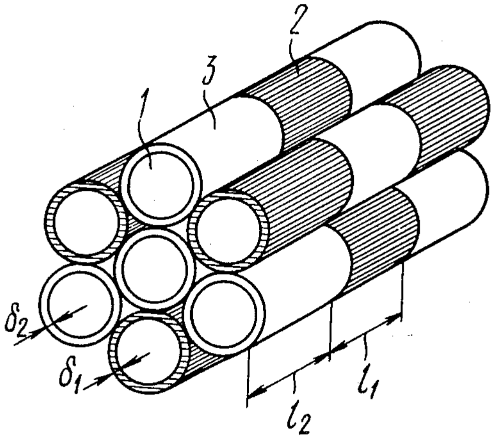
FIG. 2 is a general axonometric view of a multiwire twisted conductor according to the invention.

FIG. 2 shows one of the embodiments of coatings 2 and 3 applied to the wires 1. In this case, the coatings 2 and 3 locally alternate with one another.

If the areas of coatings locally alternate with one another, the lengths thereof are about equal as well as thicknesses $\delta_1$ and $\delta_2$ of the coating layers. Suppose $l_1 \approx l_2 \approx l$, and $\delta_1 \approx \delta_2 \approx \delta$, then the values l and $\delta$ must be chosen proceeding from the following relationship:

$$l\delta/S = 0.01 \text{ to } 10.0,$$

where S is the cross section area of the wire 1.

The values l and S have been chosen by experiment according to the range of the existing cable products, and the thickness $\delta$ of the layers of the coatings 2 and 3 has been selected according to the actual manufacturing possibilities in the hot metal coating process.

Tin and tin alloys can be used as a fusible metal, and polyurethane or rosin can be used as a corrosion-preventive fluxing composition. A coat (about 1$\mu$ thick) is applied to the copper wire surface by any suitable conventional method. The principle of manufacture of the multiwire twisted conductor consists in that during formation of a strand of the wires 1, the wires 1 coated with tin and with corrosion-preventive fluxing composition are arranged in such a way that at least two said wires 1 bearing different coatings 2 and 3 are in contact through the full length thereof. If tin is present in excess in the coating 3 on the tinned surface of the wire 1, the conductor soldering process occurs only within a limited area at the boundary between flux and tin of two copper wires, with the result that the conditions are favorable to soldering procedure.

During formation of the conductor, there are provisions for utilizing the excess of tin in the coating 3 for soldering several wires 1 coated with the fluxing composition due to the fact that it is possible to form monomolecular layers of tin on the surfaces of all the wires 1 of the conductor in the area of soldering.

EXAMPLE 1

Six copper wires 1 of 0.5 mm diameter with the tin coating 3 having thickness $\delta = 5\mu$ were twisted around a central wire 1 of 0.5 mm diameter with the polyurethane coating 2 having thickness $\delta = 10\mu$. The quality of soldering of all the wires 1 in the strand was satisfactory. The soldered joint area was equal to 12 diameters of the multiwire twisted conductor.

EXAMPLE 2

The construction of the multiwire twisted conductor was similar to that of Example 1, but used as a fluxing coating 2 was rosin with the layer thickness $\delta_2 = 2\mu$. The quality of soldering of all the wires 1 was satisfactory. The soldered joint area was equal to 12 diameters of the multiwire twisted conductor.

EXAMPLE 3

The construction of the multiwire twisted conductor was similar to that of Example 1, but use was made of three wires 1 coated with polyurethane coating 2 and four wires 1 bearing the coating 3 from tin-lead solder. The quality of soldering of all the wires 1 was satisfactory. The soldered joint area was equal to 11 diameters of the multiwire twisted conductor.

EXAMPLE 4

The construction of the multiwire twisted conductor was similar to that of Example 1, but use was made of a central wire 1 bearing the tin coating 3 and six wires 1 bearing the rosin coating 2. After soldering the multiwire twisted conductor one wire 1 was easily separated which indicated that amount of tin available on the surface of one wire 1 was insufficient to solder six wires 1. The soldered joint area was equal to 8 diameters of the conductor.

EXAMPLE 5

Seven copper wires 1 bearing alternating areas coated with tin and rosin each 10 mm long, were twisted in a strand. Offset of the different areas relative each other in the strand did not exceed 2–3 mm. The soldered joint area was equal to 10 diameters of the multiwire twisted conductor. The quality of soldering over a length of 15 mm is satisfactory.

The analysis of the above examples shows that the satisfactory quality of soldering the multiwire twisted conductor is attained due to a proper selection of the number of wires 1 bearing different coatings with taking into account the excess of tin necessary to tin the wires coating with a fluxing composition. At the same time the soldered joint area is reduced due to a decrease in amount of tin crosswise the multiwire twisted conductor.

The realization of the invention results in a 10–30% reduction of the weight of the multiwire twisted conductor due to utilization of, for example, polyurethane instead of tin (specific weight of tin is 7.3 g/cm$^3$, whereas of polyurethane is 1.2 g/cm$^3$) and at the same time in an improved service dependability of the cable due to a decreased soldered joint area, which depends on a lower thermal conductivity of the fluxing composition, which causes a lower capillary flow of tin in interstices between wires in the conductor in the process of soldering.

Figure 3:
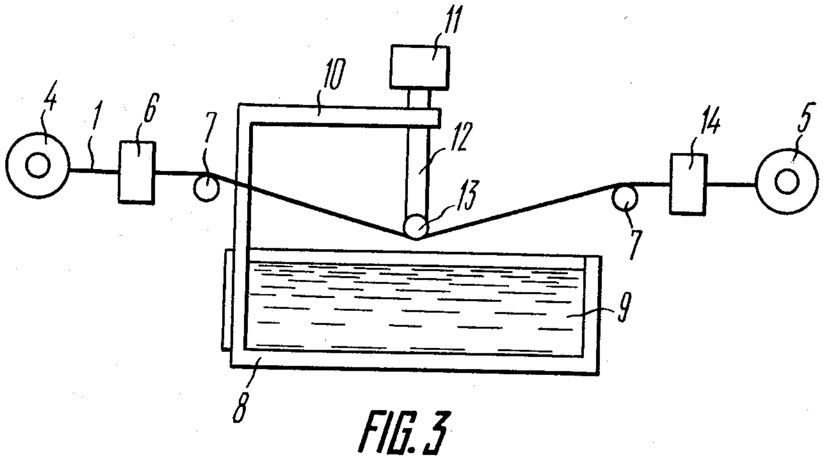
FIG. 3 is a schematic diagram of a device for coating twisted conductor wires according to the invention.

Turning now to FIG. 3, the device for coating the twisted conductor wires comprises a take-up and feed mechanism incorporating a feed section 4 of the wire 1 and a take-up section 5 of the wire 1 having been tinned, with said sections separated in space. The wire feed section 4 and take-up section 5 can be constructed, for example, in the form of spools. The device also comprises a device 6 for cleaning and fluxing the wire 1 (for example, a bath of fluxing composition), a guide 7 of the wire 1 (for example, a pulley), a bath 8 containing a melt 9 of a fusible metal (such as tin), and a drive 11 attached to said bath with a bracket 10 and adapted to move an immersion device 12 of the wire 1 reciprocally into the melt 9, with a pulley 13 arranged on one end of the immersion device 12. A pass 14 arranged in the way of the wire 1 fed into the device for coating the conductor wires serves for removing excess tin from the surfaces of the wire 1 and is provided with a hole (not shown in FIG. 3) intended to pass the wire 1.

Figure 4:
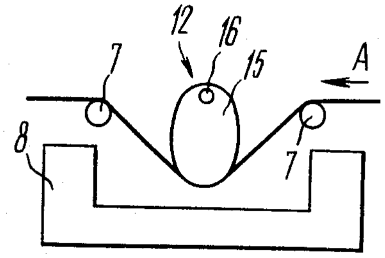
FIG. 4 is an embodiment of a wire immersion device in the form of an eccentric cam according to the invention.
Figure 5:
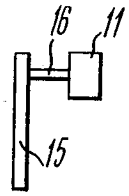
FIG. 5 is a view taken along arrow A of FIG. 4, according to the invention.

FIGS. 4 and 5 illustrate an embodiment of the wire immersion device 12 in the form of an eccentric cam 15 seated on a shaft 16 of the drive 11 of said cam and mechanically coupled with the latter.

Figure 6A:
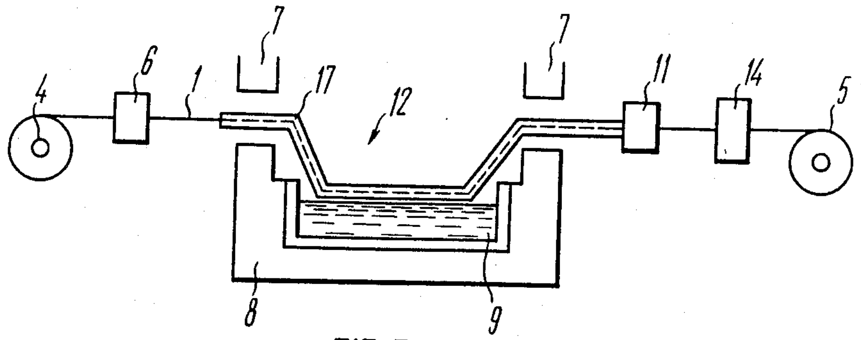
FIGS. 6 *a, b* is another embodiment of the wire immersion device in the form of a hollow frame, according to the invention.
Figure 6B:
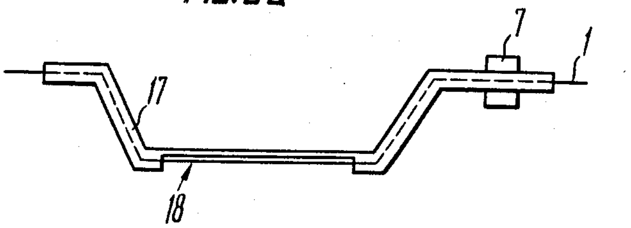

FIGS. 6 *a,b* show another embodiment of the wire immersion device 12 in the form of a hollow frame 17 provided with a slot 18 (FIG. 6*b*) which exposes a certain area of the wire 1. The frame 17 is rotatably installed in the guides 7 in the form of bearings, and is mechanically coupled with the drive 11 serving to set the frame to rotary motion. The axis of rotation of the frame 17 is aligned with an axis of holes in the passes 14 for precluding skewness of the wire 1.

Figure 7:
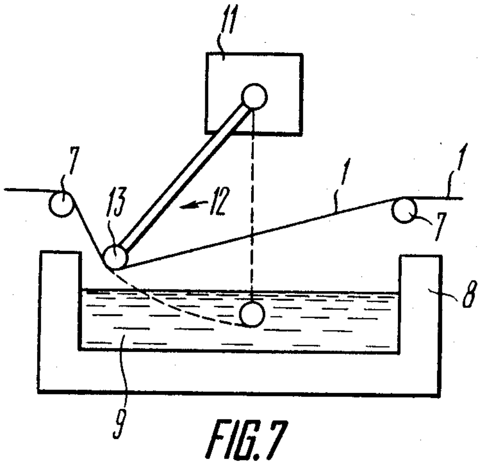
FIG. 7 is still another embodiment of the wire immersion device in the form of a pendulum, according to the invention.

FIG. 7 shows an embodiment of the immersion device 12 of the wire 1 devised in the form of a pendulum mechanically coupled with the pendulum swinging drive 11, and allowed to swing in a vertical plane. To prevent skewness of the wire 1, one end of the pendulum mounts a pulley 13 wherethrough the wire 1 is guided. The dash lines in the drawing show the initial position and the trajectory of the pendulum.

The twisted conductor wire coating device operates as follows.

The wire 1 (FIG. 3) to be coated is supplied from the feed section 4 of the take-up and feed mechanism through the fluxing device 6 and through the guides 7 in the form of pulleys, and is immersed by the immersion device 12 into the bath 8 filled with the melt 9 of a fusible metal or alloy, wherein definite areas of the wire 1 immersed into the melt undergo coating, with the wire reciprocating periodically in the vertical plane in predetermined sequence controlled by the drive 12. Then the wire 1 is gaged by the pass 14 and is directed to the take-up section 5.

The device according to the invention is characterized in that the immersion device in the form of the eccentric cam 15 (FIG. 4), hollow frame 17 with the slot 18 (FIG. 6) or pendulum (FIG. 7) permits periodic dipping of the wire 1 into the melt 9 in predetermined sequence, with the result that locally alternating areas formed on the surface of the wire 1 bear the tin coating 3 (FIG. 2) and the fluxing coating 2. For example, in tinning the copper wire 1 having a diameter of 0.5 mm, areas 10 to 15 mm long bearing the tin coating 3 and areas of the same length bearing the rosin (or polyurethane) coating 2 are formed.

In realizing the tinning process in the device herein proposed, the tinning process efficiency can be improved by 1.5 or 2 times, a high quality of the coatings 2 and 3 applied to the locally alternating areas can be provided, and the expenditure of tin throughout the length of the wire 1 can be reduced by 1.5 or 2 times.

The quality of the coating 3 has been estimated by measuring the thickness of the coating 3 through the full length of the wire 1. It has been found that the coating 3 is uniform in thickness to within $\pm 0.1\mu$, with the coating thickness $\delta$ equal to $2\mu$ as compared to tin coatings applied with the prior art devices wherein the uniformity of coating in thickness is $\pm 0.2$ to $\pm 0.3\mu$.

What is claimed is:

1. An elongate multiwire twisted conductor, comprising:

a plurality of wires, each having a coating through substantially the full length thereof;

said coating serving to permit soldering and protection of said wire against corrosion;

said coating of at least one, but not all, of said wires, in substantially any conductor cross section substantially transverse to the axis of said multiwire twisted conductor, comprising a fluxing composition; and said coating of all other said wires in said substantially transverse cross section comprising a fusible, metallic soldering material.

2. A multiwire twisted conductor as claimed in claim 1, in which said coatings of said wires are applied homogeneously through substantially the full length of each of said wires.

3. An elongate multiwire twisted conductor comprising:

a plurality of wires, each having a coating through substantially the full length thereof;

said coating serving to permit soldering and protection of said wire against corrosion; and said coating consisting of alternating areas of a fluxing composition coating and a fusible, metallic soldering material coating through substantially the full length of said wires.

4. A multiwire twisted conductor as claimed in claim 3, wherein each of said coated wires satisfy the following condition:

$$l\delta/S = 0.01 \text{ to } 10.0,$$

where:

l is the length of said area of said coating;

$\delta$ is the thickness of said coating;

S is the wire cross-section area.

5. The conductor of claim 4 in which said fusible, metallic soldering material is selected from the group consisting of tin and tin alloys.

6. The conductor of claim 4 in which said fluxing composition is selected from the group consisting of polyurethane, rosin and mixtures thereof.

7. The conductor of claim 4 in which the thickness of said coating of fusible, metallic soldering material is uniform to within about $\pm 0.1$ micron.

8. The conductor of claim 4 wherein offset of the alternating areas of said coatings on said wires forming said multiwire twisted conductor, with respect to one another through substantially the entire length of said wires, does not exceed 3 mm.

* * * * *